(12) United States Patent
Hägler et al.

(10) Patent No.: US 12,485,807 B2
(45) Date of Patent: Dec. 2, 2025

(54) TABLE DEVICE

(71) Applicant: GRAMMER Aktiengesellschaft, Ursensollen (DE)

(72) Inventors: Thomas Hägler, Wernberg-Köblitz (DE); Christopher Neidl, Schmidgaden (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 168 days.

(21) Appl. No.: 18/484,138

(22) Filed: Oct. 10, 2023

(65) Prior Publication Data

US 2024/0140290 A1 May 2, 2024

(30) Foreign Application Priority Data

Oct. 26, 2022 (DE) .................. 10 2022 128 321.6

(51) Int. Cl.
*B60N 3/00* (2006.01)

(52) U.S. Cl.
CPC ................................ *B60N 3/004* (2013.01)

(58) Field of Classification Search
CPC ..... B60N 3/004; B60N 3/102; B64D 11/0638
See application file for complete search history.

(56) References Cited

U.S. PATENT DOCUMENTS

| | | | |
|---|---|---|---|
| 6,279,992 B1 | 8/2001 | Plocher et al. | |
| 7,104,599 B2* | 9/2006 | Berger | B60N 3/004 |
| | | | 40/594 |
| 9,156,555 B2* | 10/2015 | Shih | B64D 11/0624 |
| 9,242,733 B2* | 1/2016 | Pajic | B64D 11/06 |
| 9,403,596 B2* | 8/2016 | Pajic | H02J 7/342 |
| 11,305,876 B2* | 4/2022 | Wanner | B64D 11/0015 |
| 11,952,124 B2* | 4/2024 | Frost | B64D 11/0638 |
| 2007/0283855 A1* | 12/2007 | Pozzi | A47B 23/043 |
| | | | 108/44 |
| 2016/0023766 A1* | 1/2016 | Pajic | H02J 50/10 |
| | | | 29/428 |

FOREIGN PATENT DOCUMENTS

| | | | | |
|---|---|---|---|---|
| CN | 116039479 A | * | 5/2023 | ............... B60N 2/90 |
| DE | 19833888 | | 1/2000 | |
| DE | 102019128200 | | 4/2021 | |
| FR | 3119350 | | 8/2022 | |
| JP | H06-065077 | | 9/1994 | |
| JP | 2022-011192 | | 1/2022 | |
| KR | 20240030143 A | * | 3/2024 | ........... B60N 4/0044 |
| KR | 20250066306 A | * | 5/2025 | ............. B60N 3/004 |

OTHER PUBLICATIONS

KR-20250066306—Translation (Year: 2025).*
KR-20240030143 Translation (Year: 2024).*
CN-116039479 Translation (Year: 2023).*
Extended European Search Report for Europe Patent Application No. 23193274.0, dated Feb. 7, 2024, 5 pages.
Official Action for Germany Patent Application No. 102022128321.6, dated Apr. 28, 2023, 12 pages.

* cited by examiner

*Primary Examiner* — David R Dunn
(74) *Attorney, Agent, or Firm* — Sheridan Ross P.C.

(57) ABSTRACT

The invention relates to a table device, in particular for a seat arrangement in a person transport means comprising a first table element, wherein the first table element at least partially encloses a second table element, wherein the second table element is displaceable both together with the first table element and independently of the first table element between a first position and a second position.

10 Claims, 16 Drawing Sheets

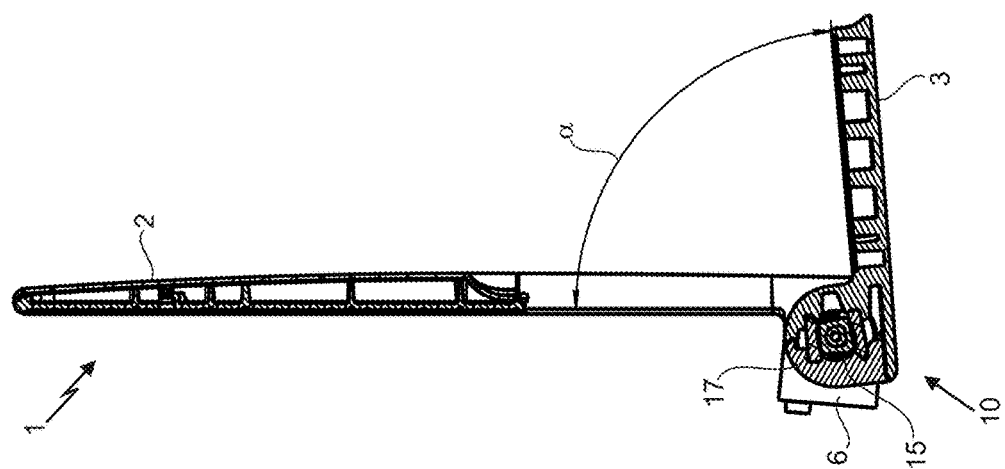
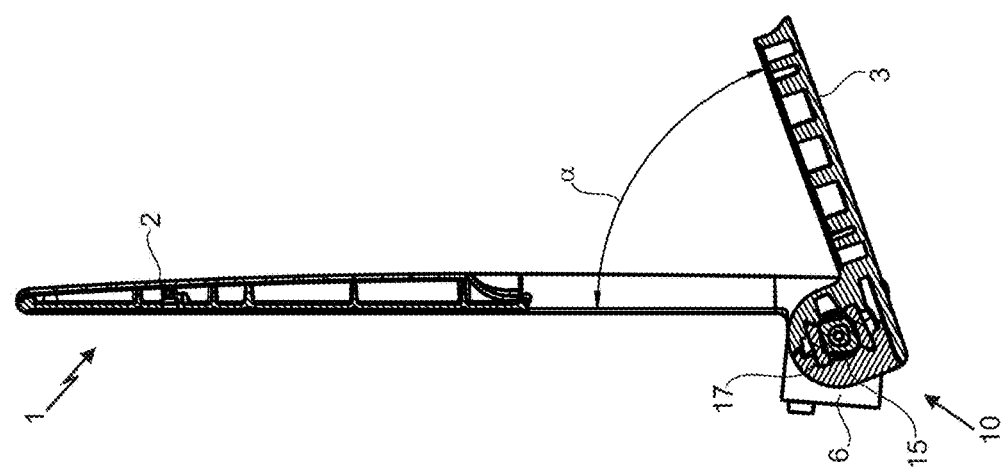
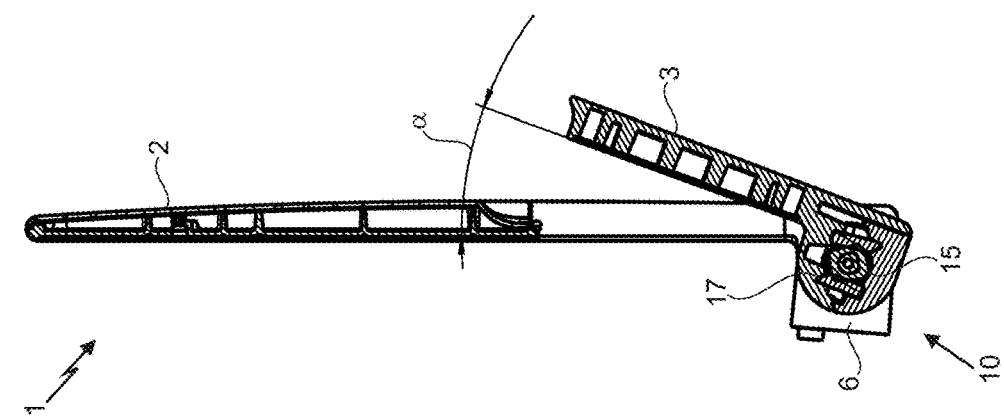
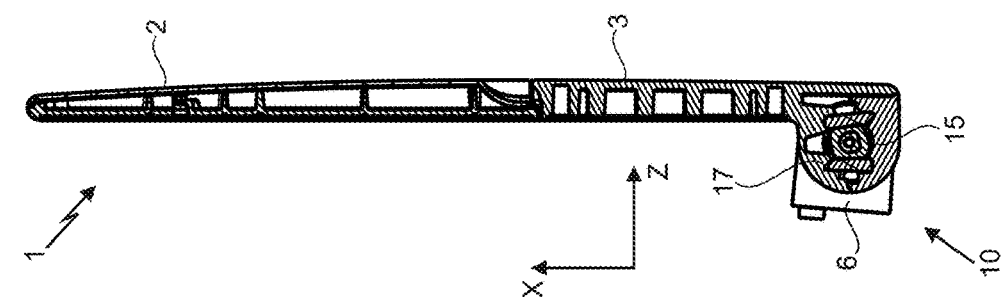

TABLE DEVICE

CROSS REFERENCE TO RELATED APPLICATION

This application claims the benefit of German Patent Application No. 10 2022 128 321.6, filed Oct. 26, 2022, the contents of which are incorporated herein by reference in its entirety.

FIELD

The invention relates to a table device, in particular for a seat arrangement in a passenger transport means, comprising a first table element.

BACKGROUND

Such means of passenger transport are, for example, rail vehicles, buses or also aircraft. The seat arrangements are usually arranged in rows in the passenger transport means. Furthermore, the seat arrangements usually comprise a table device with a table element which is displaceable, or foldable, between a first position and a second position. The table devices are often in front of or to the side of the respective seat arrangement and serve to store objects, beverages, or food. Such a table device may be arranged at the rear of a front seat arrangement or at a section of the passenger transport means. The latter is the rule for seat arrangements in the first row.

However, the space between two seat arrangements is often limited, so that an unfolded table element is often perceived as a nuisance. Furthermore, there is usually a lack of an alternative storage option for smaller items, for example the smartphone or a drink.

SUMMARY

The object of the invention is to provide a table device in which the aforementioned disadvantages are overcome or at least reduced.

The object is solved by the object of the table device and the seat arrangement of the invention. Advantageous embodiments are to be taken from the detailed description of the invention.

The core idea of the invention is a table device, in particular for a seat arrangement in a passenger transport means, comprising a first table element, the first table element at least partially enclosing a second table element, the second table element being displaceable both together with the first table element and independently of the first table element between a first position and a second position.

Accordingly, the second table element is smaller than the first table element and can be used for smaller items, for example a smartphone, keys, etc., or a beverage. A shelf is thus provided which restricts the space between two seat arrangements to a much lesser extent. If required, however, a larger support surface in the form of the first table element can be used.

The table device extends along a longitudinal axis X, a width axis Y and along a height axis Z.

According to a particularly preferred embodiment, the first table element and the second table element can be pivoted about a pivot axis. Preferably, the pivot axis runs in a lower area of the first table element along the longitudinal axis X and in a lower area of the second table element along the longitudinal axis X. Advantageously, the second table element can be pivoted about the pivot axis both together with the first table element and independently of the first table element.

According to a further preferred embodiment, the table device comprises at least two fastening elements by means of which the table device can be arranged on the seat arrangement and/or on the passenger transport means. Preferably, the first table element is pivotably arranged on the at least two fastening elements. Advantageously, the pivot axis extends through the at least two fastening elements.

Advantageously, an angle $\beta$ is formed between the first position and the second position. The angle $\beta$ is preferably in a range between 80° and 95°, more preferably between 85° and 90°, more preferably at about 90°. Furthermore, it is advantageous that an angle $\alpha$ is stretched between the first table element and the second table element. Preferably, the angle $\alpha$ lies in a range between 0° and 95°. Thus, if both the first table element and the second table element are together in the first position or together in the second position, the angle $\alpha$ is about 0°. If the first table element is in the first position and the second table element is in the second position, the angle $\alpha$ is in a range between 85° and 95°, preferably about 90°.

According to a further advantageous embodiment, the first table element has a recess in which the second table element can be arranged. Preferably, the first table element is U-shaped. It is advantageous that the first table element and/or the second table element provide a support surface or a storage surface in the second position. Advantageously, the first table element has a plate-like design. Preferably, the first table element has a first surface which at least partially forms the support surface in the second position. Preferably, the second table element is also plate-like. The second table element also preferably has a second surface which at least partially forms the support surface in the second position. If both the first table element and the second table element are in the second position, the first surface of the first table element and the second surface of the second table element together advantageously form the support surface.

Accordingly, the first position is advantageously a "folded" position in which the table elements extend substantially parallel to a rear side of the front seat arrangement or a section, for example a wall element, of the passenger transport means. Thus, in the first position, the table elements do not significantly restrict the space between them. In the second position, the "unfolded position", either only the second table element or the second table element is pivoted together with the first table element by the angle R.

In this case, the second table element can be pivoted from the first position to the second position and also from the second position back to the first position. Thereby, the first table element remains unchanged in the first position. Such an embodiment allows only a comparatively small storage area to be provided without excessively restricting the space between the seat arrangements. If a larger storage area is required, the first table element can be swiveled together with the second table element from the first position to the second position and also from the second position back to the first position.

According to a further advantageous embodiment, a holding and adjustment mechanism is provided which provides at least a first resistance force. Preferably, at least one first resistance force acts between the first table element and the second table element, so that a joint movement from the first position to the second position as well as from the second position to the first position is enabled. Accordingly, during the joint movement of the table elements from the first position to the second position or from the second position to the first position, advantageously only a force action, for example at the first table element, has to be applied. The further table element, for example the second table element, is carried along by the at least one first resistance force. If the second table element is first swiveled from the first to the second position and then the first table element is also swiveled to the second position, at least one first resistance force acts again between the two table elements in the second position. When the first table element is swiveled back into the first position, the second table element is also swiveled into the first position. It is therefore not necessary to swivel both table elements back separately.

Advantageously, the at least one first resistance force enables a braked movement of the second table element from the first position to the second position. Such a braked movement avoids a fast uncontrolled folding down of the table element.

According to another preferred embodiment, the holding and adjustment mechanism provides at least one second resisting force. Preferably, the at least one second resisting force acts between the first table element and at least one of the at least two fastening elements. Preferably, by means of the at least one second resistance force, the first table element is held in the first position. The second table element is thus also held in the first position by the effect of the at least one first resistance force between the two table devices. For a displacement or pivoting of the first table element and/or the second table element, a force must therefore be applied which overcomes the at least one second resistance force. The at least one second resistance force enables a braked movement of the first table element from the first position to the second position. By the effect of the at least one first resistance force between the two table elements, a braked movement from the first position to the second position is thus also made possible for the second table element when the table elements are pivoted together. By such a braked movement a fast uncontrolled folding down of the table elements is avoided.

According to a further advantageous embodiment, the holding and adjustment mechanism comprises two mandrel-like elements. The mandrel-like elements are each arranged on a bearing section of the first table element. Preferably, the mandrel-like elements are integrally formed as bearing sections. The mandrel-like elements may be integrally formed with the bearing section or integrally formed with the bearing section. By a one-piece design is meant here that all sections are made from a single and uniform part. A one-piece design in this context means that all sections, although not made from a single and uniform part, are not only firmly but intimately connected to each other in such a way that they do not appear as several components joined to each other and in any case cannot be detached from each other without destroying them in the process. The bearing sections are further advantageously provided on a rear side of first table element. The rear side of the first table element is opposite the first surface along the height axis Z. Preferably, the two mandrel-like elements are arranged opposite each other along a width axis Y.

Advantageously, each mandrel-like element projects through a through channel of a corresponding fastening element. Advantageously, the pivot tab extends centrally through the mandrel-like elements. The through channel comprises a hollow cylindrical receiving area in which a circular guide area of the respective mandrel-like element is seated or guided.

According to a further advantageous embodiment, a first friction element is arranged between a mandrel-like element and the respective fastening element. Preferably, two first friction elements are provided, with a first friction element being arranged between a mandrel-like element and the respective fastening element in each case. Advantageously, the first friction element is fastened to or in the fastening element. Such fastening can be effected, for example, by a form-fitting and/or a Material-fitting connection. Advantageously, the first friction element is fastened to or in the fastening element in such a way that no movement of the first friction element relative to the fastening element is possible. Preferably, there is an overpressing of the first friction element to the mandrel-like element. Preferably, the second resistance force is caused by friction between the mandrel-like element and the first friction element. Thus, the friction between the first friction element and the mandrel-like element keeps the first table element at least in the first position and also allows a braked movement of the first table element between the first position and the second position.

According to another particularly preferred embodiment, the second table element is pivotally arranged on the first table element and the fastening elements. Preferably, the two mandrel-like elements project into a receiving element of the second table element in sections. Preferably, one fastening element in each case comprises an annular guide projection against which the receiving element rests.

According to a further particularly preferred embodiment, an attachment component is fastened to at least one mandrel-like element. Advantageously, a second friction element is arranged between the top component and a receiving element of the second table element. Preferably, the second friction element is attached to or in the receiving element of the second table element. Thereby, it is advantageous that there is an overpressing of the second friction element to the attachment component. Preferably, the first resistance force is caused by the friction between the attachment component and the second friction element. In this context, it is advantageous that the receiving element is formed by two shell-like elements which are connected to one another by a form-fitting and/or force-fitting connection.

Preferably, the attachment component comprises a plurality of friction surfaces. Thereby, depending on the angle α, a friction connection exists between the friction element and at least one friction surface. In a state in which the first table element and the second table element are in the second position, the friction between the attachment component and the second friction element is thus advantageously sufficiently large to enable joint displacement of the first table element and the second table element from the second position to the first position.

According to a further embodiment, at least one indentation and/or receptacle is provided in the second surface of the second table element. The receptacle may be configured as a receptacle for a beverage. It would also be conceivable to design the receptacle for a smartphone or for other small objects. Cumulatively or alternatively, such at least one indentation and/or receptacle may be provided in the first table element.

The present object is further solved by a seat arrangement in a passenger transport means comprising a table device according to one of the aforementioned embodiments. The seat arrangement can be equipped with all the features already described above in the context of the table device, either individually or in combination with one another, and vice versa.

Further advantages, objectives and features of the present invention will be explained with reference to the following description of the accompanying figures. Similar components may have the same reference signs in the various embodiments.

BRIEF DESCRIPTION OF THE DRAWINGS

The figures show:

FIGS. 9a to 9d sectional view (section (E-E) of a table device in various states;

DETAILED DESCRIPTION

Figure 1:
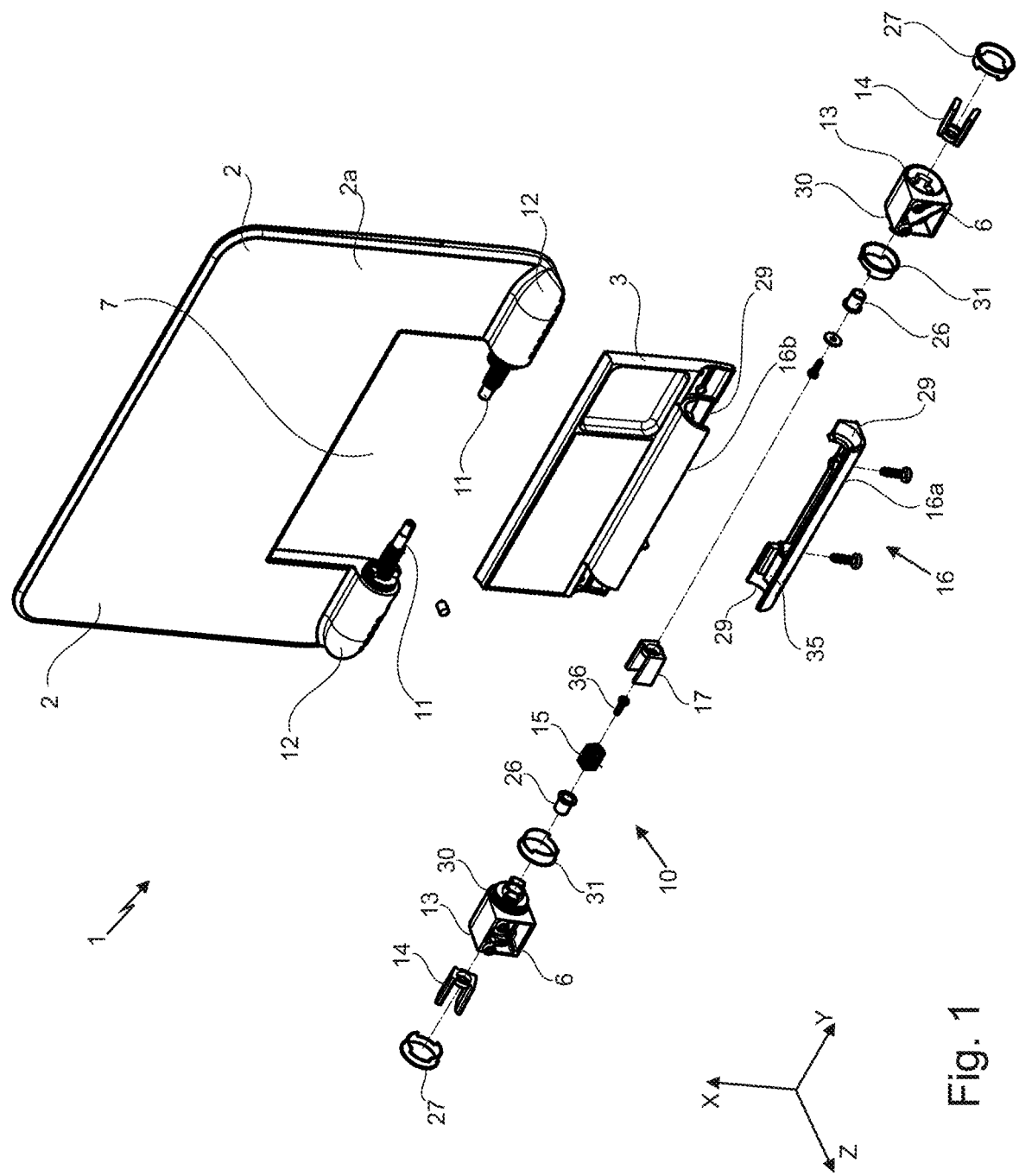
FIG. 1 an exploded view of a table device.

FIGS. 1 to 8 show a table device 1, in particular for a seat arrangement 100 in a passenger transport means comprising a first table element 2, wherein the first table element 2 at least partially encloses a second table element 3, wherein the second table element 3 is displaceable between a first position and a second position both together with the first table element 2 and independently of the first table element 2.

The table device 1 extends along a longitudinal axis X, a width axis Y, and along a height axis Z.

A pivot axis S is provided about which the first table element 2 and the second table element 3 are pivotable. The pivot axis S extends along the width axis Y and runs in a lower area 4 of the first table element 2 seen along the longitudinal axis X. Likewise, the pivot axis S runs in a lower area 5 of the second table element 3 seen along the longitudinal axis X. Thus, the first table element 2 and the second table element 3 can be pivoted around the pivot axis S. When the first table element 2 and/or the second table element 3 are pivoted from the first position to the second position and vice versa, the pivoting occurs by an angle β. The angle β is thus arranged between the first position and the second position. The angle β lies in a range between 80° and 95° preferably between 85° and 90° further preferably at about 90°. When the table elements 2,3 are pivoted relative to each other, an angle α is present between the two table elements 2,3. The angle α is in a range between 0° and 95° preferably at about 90°.

Figure 2A:
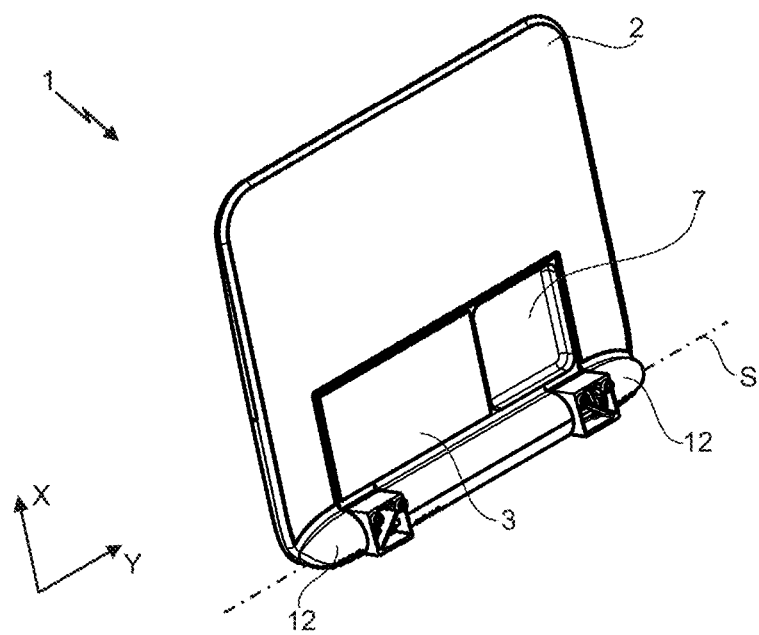
FIGS. 2a to 2c views of a table device according to various embodiments.
Figure 2B:
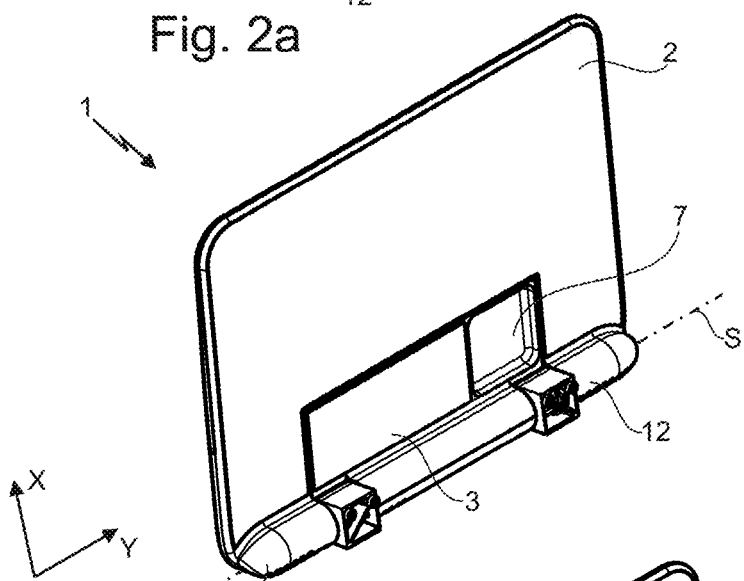
Figure 2C:
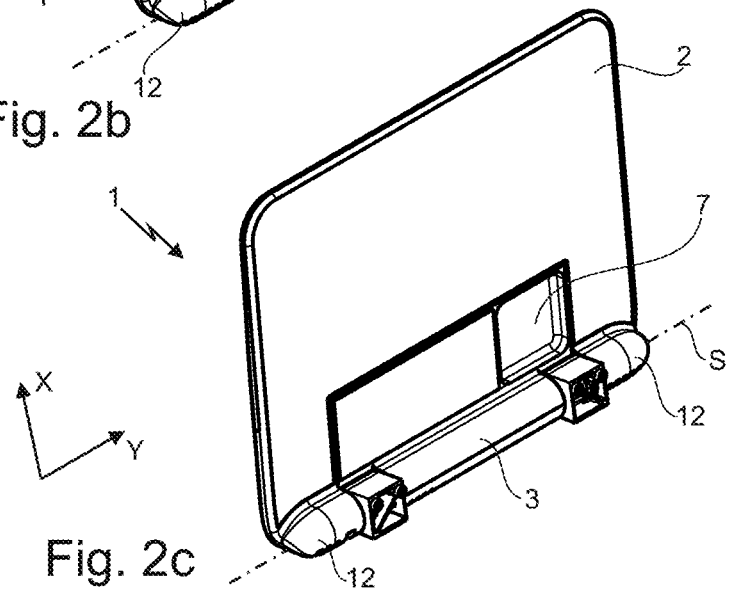

Furthermore, the first table element 2 has a recess 7 in which the second table element 3 can be arranged. The second table element 3 is thus arranged in the recess 7 when both table elements 2,3 are in the same position, i.e. the first or the second position. The first table element 2 is, moreover, of plate-like design. The first table element 2 and the second table element 3 can have any polygonal base surface. The corresponding shape and also the corresponding size of the two table elements 2,3 can be adapted to the requirements. In FIGS. 2a-2c some different embodiments are shown. In FIG. 2a, the first table element 2 is approximately square and the second table element 3 is essentially rectangular.

In FIGS. 2b and 2c, the first table element 2 is substantially rectangular in shape. Likewise, the second table element 3 is substantially rectangular in shape. However, these embodiments are not intended to represent a limitation of generality.

The first table element 2 further comprises a first surface 8, which at least partially forms a supporting surface when the first table element 2 is in the second position. The second table element 3 is also plate-like and also has a second surface 9. When both table elements 2, 3 are in the second position, the first surface 8 and the second surface 9 together form the support surface or storage surface. This is clearly visible in FIG. 3c.

Figure 3A:
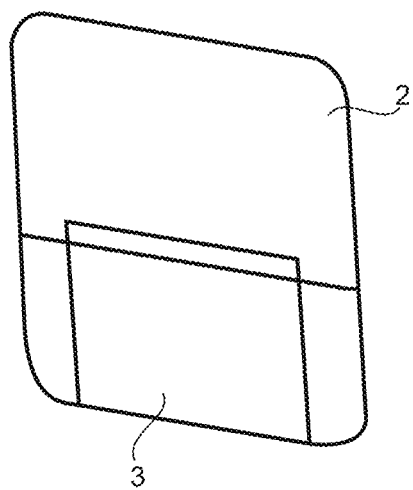
FIGS. 3a to 3c views of a table device in various states.
Figure 3B:
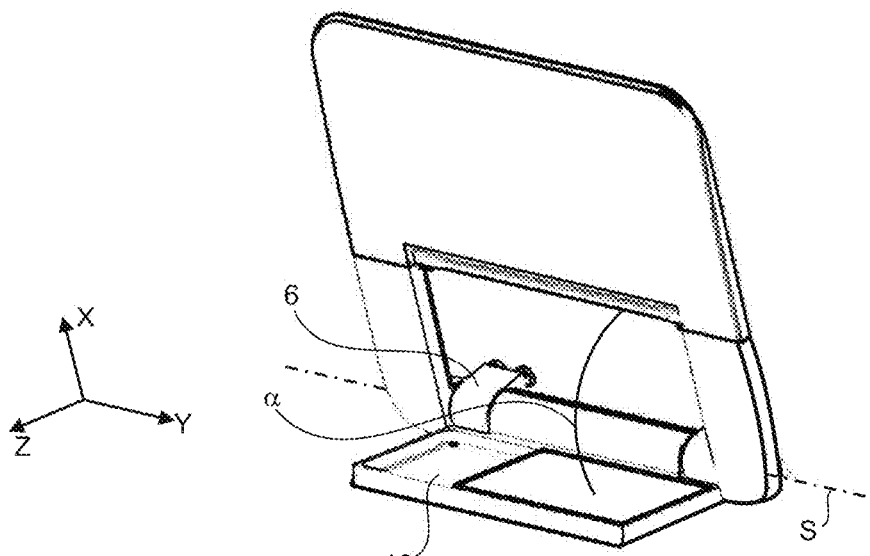
Figure 3C:
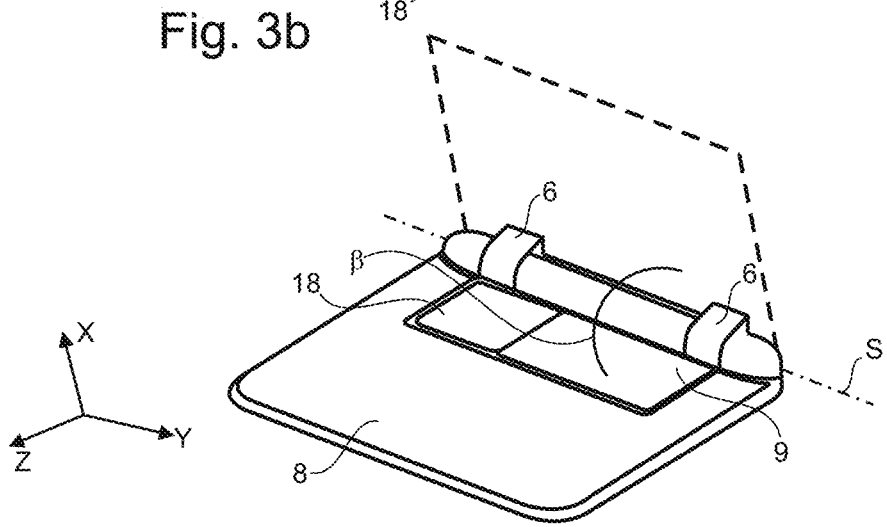

FIG. 3b shows a condition in which only the second table element 3 is in the second position. The first table element 2 is in the first position. Here, only the second surface 9 represents the supporting surface.

The second surface 9 further has an indentation 18. This can be square, rectangular, circular or otherwise polygonal in shape. This indentation 18 can serve to accommodate small objects, for example keys, or to accommodate a beverage container. Furthermore, it is conceivable that several indentations 18 and/or receptacles are provided in the second surface 9. It is also conceivable that at least one separate receiving element 16 is inserted in the second surface 9. Alternatively or cumulatively, said receptacles or indentations 18 may also be provided in the first surface 8.

A holding and adjustment mechanism 10 is provided, which provides at least one first resistance force. This at least one first resistance force acts between the first table element 2 and the second table element 3, so that a joint movement from the first position to the second position as well as from the second position to the first position is possible. Due to the at least one first resistance force, a braked movement of the second table element 3 from the first position to the second position is enabled.

Further, the holding and adjustment mechanism 10 provides at least one second resistance force. The at least one second resistance force acts between the first table element 2 and at least one of the at least two fastening elements 6. Thereby, by means of the at least one second resistance force, the first table element 2 is held in the first position. By means of the at least one second resistance force, a braked movement of the first table element 2 from the first position to the second position is further enabled.

The holding and adjustment mechanism 10 comprises two mandrel-like elements 11, as can be seen, for example, in FIG. 1. The mandrel-like elements 11 are each arranged at a bearing portion 12 of the first table element 2. Preferably, the mandrel-like elements 11 are each integrally formed with a bearing section 12. The bearing sections 12 are further provided on a rear side 2a of the first table element 2. The rear side 2a of the first table element 2 is opposite the first surface 8 along the height axis Z. The bearing sections 12 are substantially cylindrical in shape and project away from the rear side 2a of the first table element 2 along the height axis Z. The bearing section is readily apparent in FIGS. 1, 2a-2c and 5-9. The two mandrel-like elements 11 are thus offset along the height axis Z behind the recess 7. Further, both mandrel-like elements 11 are arranged opposite to each other along the width axis Y. The two mandrel-like elements 11 thus project into a plane extending along the longitudinal axis X and along the width axis Y parallel to the recess 7. If necessary, the two mandrel-like elements 11 may also project at least partially into the recess 7 of the first table element 2.

Figure 4:
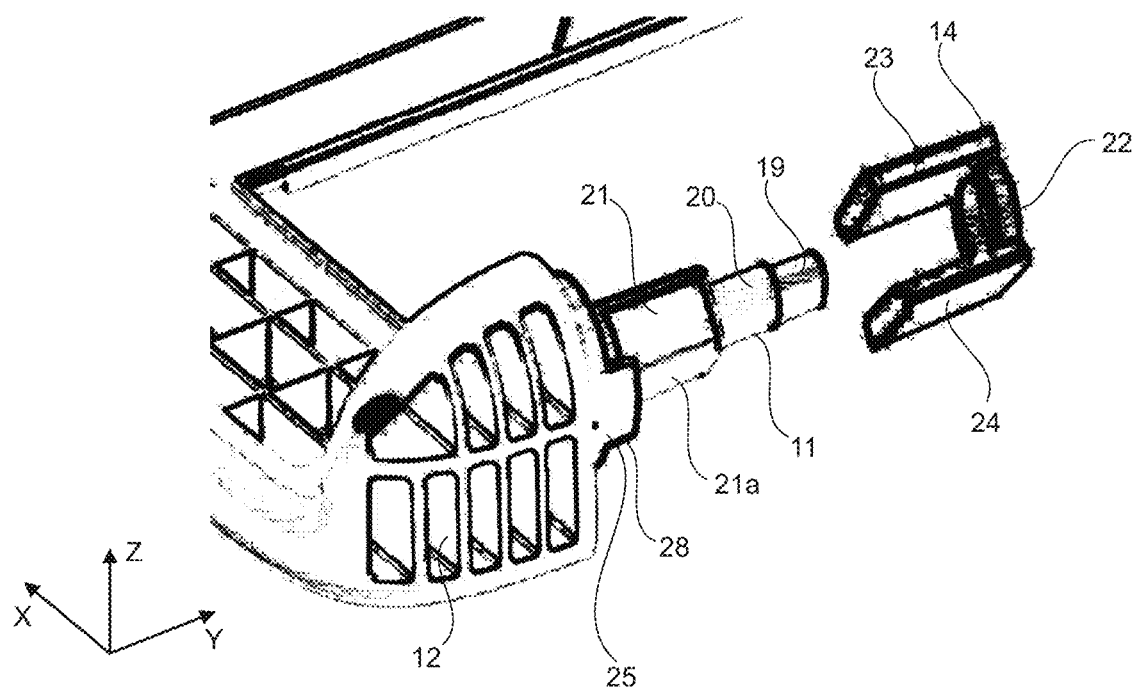
FIG. 4 Sectional exploded view of a table device.

In FIG. 4, a mandrel-like element 11 is shown. The mandrel-like element 11 comprises a front portion 19, a middle portion 20, a rear portion 21, and a circular guide area 25. Along the width axis Y, the front portion 19 grinds against the middle portion 20, and the latter grinds against the rear portion 21. The rear portion 21 finally merges into the circular guide area 25. The circular guide area 25 is integrally formed with the bearing section 12. Here, a diameter of the front portion 19 is smaller than a diameter of the middle portion 20. Further, a diameter of the middle portion 20 is smaller than a diameter of the rear portion 21. The diameter of the rear portion 21 is smaller than the diameter of the circular guide portion 25. The rear portion 21 includes a plurality of friction surfaces 21a.

The fastening elements 6 comprise a first through channel 13, said first through channel 13 comprising a hollow cylindrical receiving area 32 in which the circular guide area 25 of the mandrel-like element 11 is received. The pivoting movement of the first table element 2 is thus guided by the bearing of the hollow cylindrical receiving area 32 of the fastening element 6 on the circular guide area 25 of the mandrel-like element 11. The respective first through channel 13 thus serves as a bearing of the respective mandrel-like element 11 in such a way that the first table element 2 is pivotably arranged on the at least two fastening elements 6. Advantageously, a bearing ring 27 is furthermore provided between the circular guide area 25 and the hollow cylindrical receiving area 32. One mandrel-like element 11 each projects through a first through channel 13 of a correspondingly associated fastening element 6. The pivot axis S extends centrally through the mandrel-like elements 11 and through the respective first through channels 13.

A first friction element 14 is arranged between a mandrel-like element 11 and the respective fastening element 6. The respective first friction element 14 is fastened to or in the fastening element 6. The arrangement of the respective first friction element 14 is such that there is an overpressing of the first friction element 14 towards the respective mandrel-like element 11. Thus, the second resistance force is caused by the friction between a mandrel-like element 11 and the associated first friction element 14. Accordingly, the friction or the overpressure between the two mandrel-like elements 11 and the associated first friction elements 14 keeps the first table element 2 in the first position and further enables a braked movement of the first table element 2 from the first position to the second position.

Figure 5:
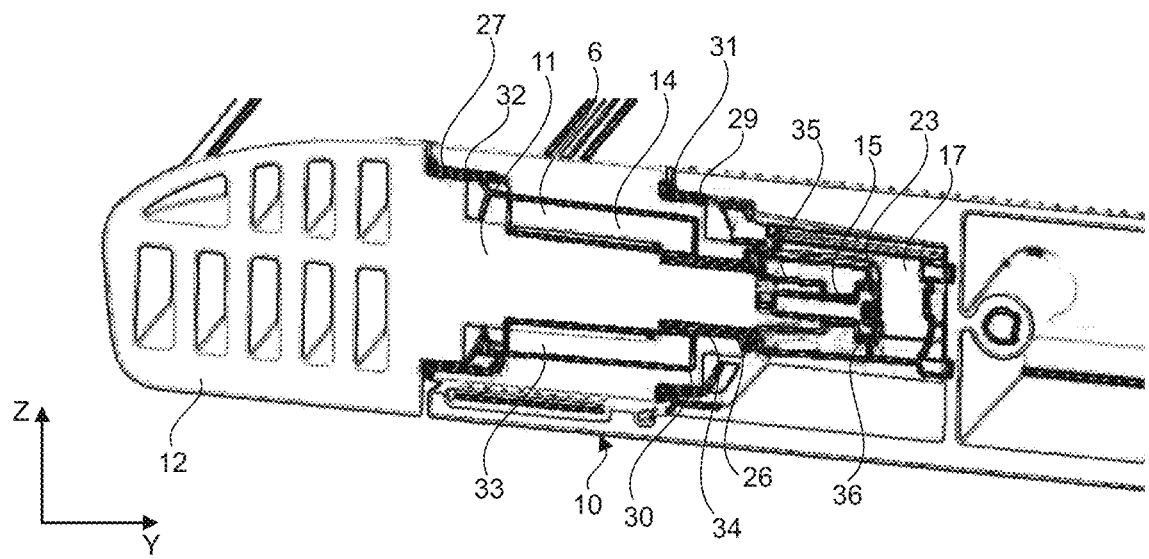
FIG. 5 Sectional view of a table device.
Figure 6:
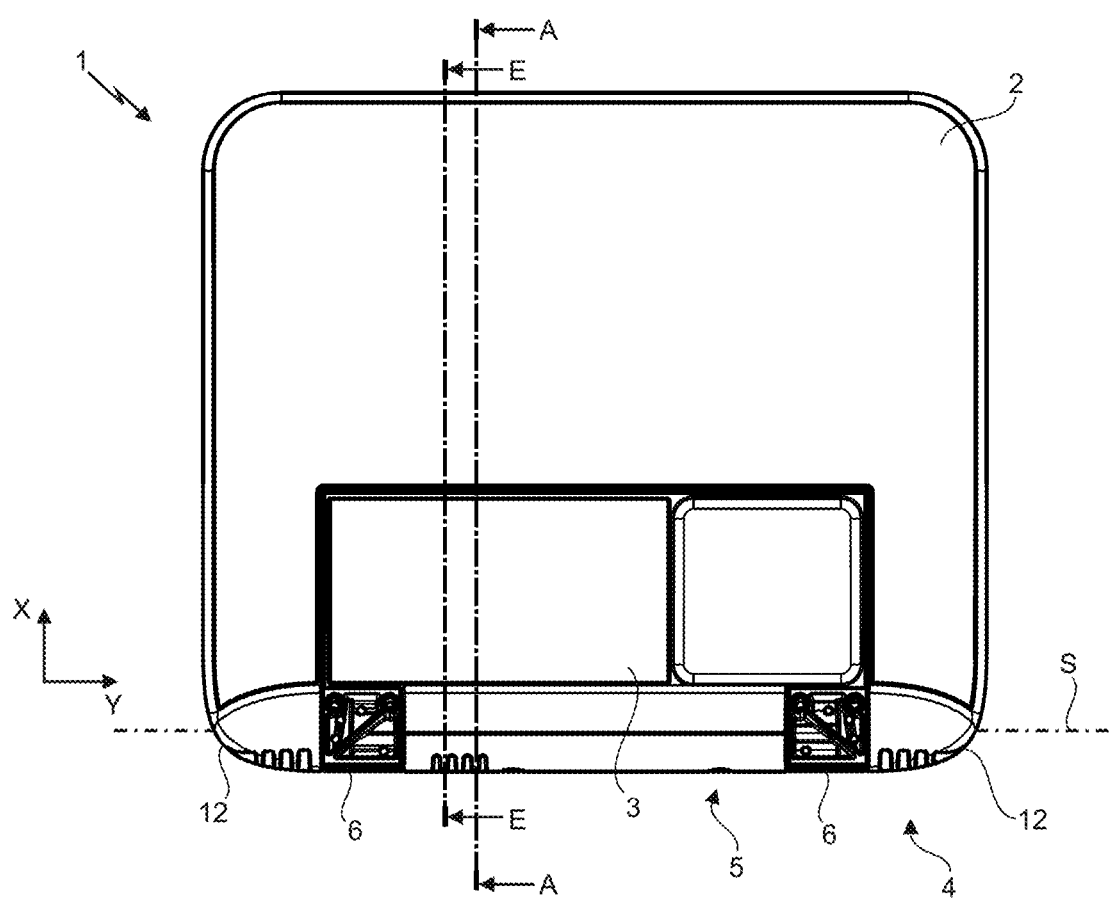
FIG. 6 Top view of a table device from the rear.
Figure 7:
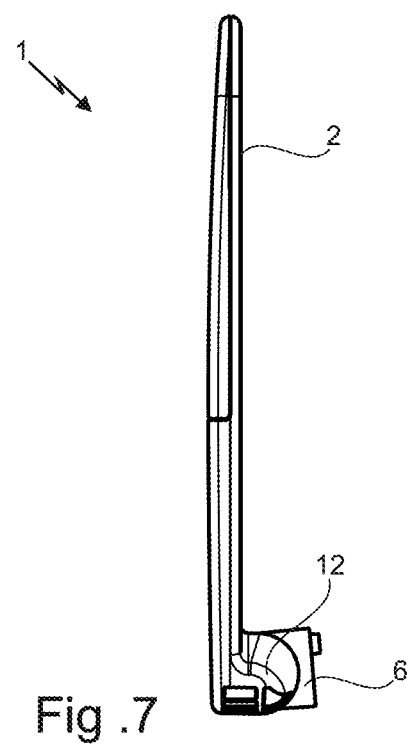
FIG. 7 Side view of a table device.
Figure 8D:
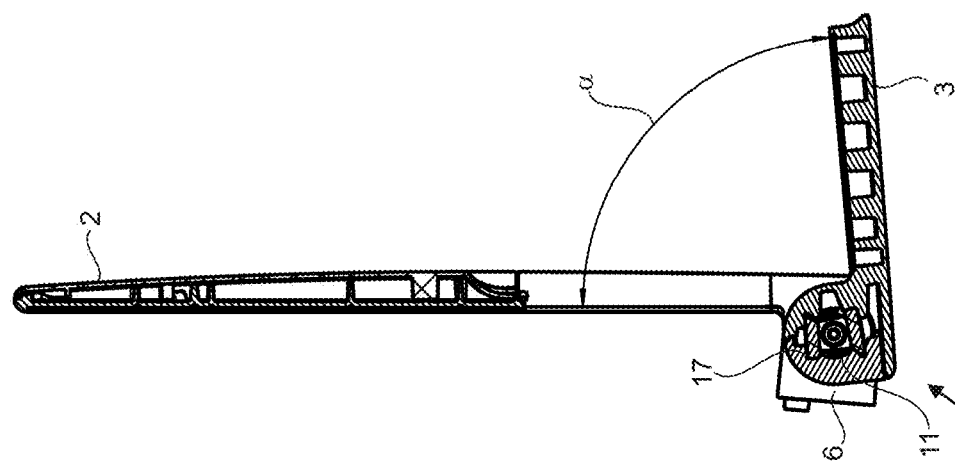
FIGS. 8a to 8d Sectional view (cutaway (A-A) of a table device in various states.
Figure 8C:
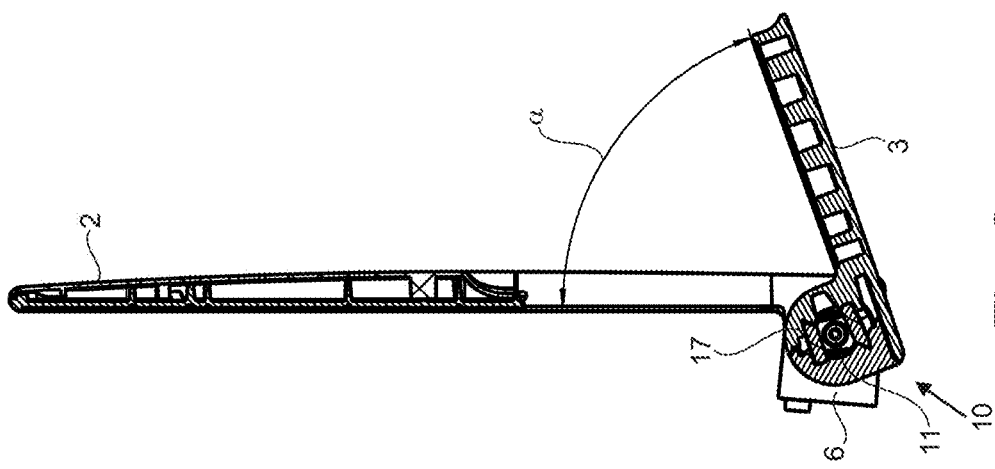
Figure 8B:
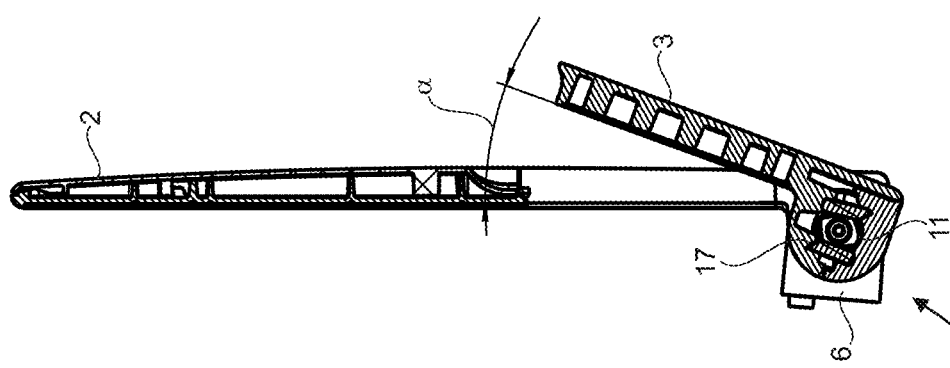
Figure 8A:
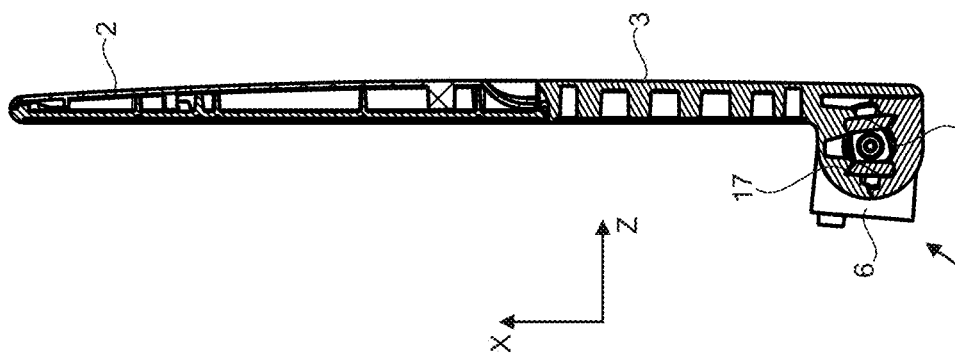

In FIG. 4, in addition to the mandrel-like element 11, a corresponding first friction element 14 is also shown. The first friction element 14 comprises an annular central portion 22. In FIG. 5, it can be seen that the annular central portion 22 is seated on the middle portion 20 of the mandrel-like element 11. A detailed illustration of the first friction element 14 is also shown in FIGS. 10a to 10d. Thus, the first friction element 14 is located along the width axis Y closer to the bearing section 12 than the front portion 19 of the mandrel-like element 11.

Further, the first friction element 14 comprises a first wing element 23 and a second wing element 24, the two wing elements 23, 24 being integrally formed with the annular central portion 22. Furthermore, both wing elements 23, 24 comprise friction surfaces 23a, 24a, respectively. These friction surfaces 23a, 24a are opposite each other and contact the friction surfaces 21a of the rear portion 21 of mandrel-like element 11. The two wing elements 23, 24 are fixed in the respective fastening element 6 in a second receiving portion 33, such that when the first table element 2 is pivoted, the two wing elements 23, 24 do not move with it and are thus stationary with respect to the respective fastening element 6. Due to such a pivoting, the mandrel-like elements 11 rotate within the first through channel 13 and the friction surfaces 21a rub against the friction surfaces 23a, 24a of both wing elements 23, 24. The two wing elements 23, 24 are preferably positively received in the second receiving area 33 of the first through channel 13. The second receiving region 33 is configured in such a way that, in the installed state, there is an overpressing of the two wing elements 23, 24 towards the respective friction surfaces 21a of the mandrel-like element 11.

As already explained, the first through channel 13 of the fastening element 6 comprises the hollow cylindrical receiving region 32, the second receiving region 33 for the first friction element 14 and an end region 34 which has a reduced diameter. The middle part of the mandrel-like element 11 protrudes through the end region 34, so that a further bearing of the pivoting of the first table element 2 relative to the fastening element 6 is provided. Advantageously, a bearing sheath 26 is provided between the middle part 20 of the mandrel-like element 11 and the end region 34, and between the middle part 20 of the mandrel-like element 11 and the annular central portion 22 of the first friction element 14.

According to a preferred embodiment, the circular guide area 25 may comprise at least one end stop element 28 which abuts at least one corresponding end stop element 28 in or on the fastening element 6 preferably in the second position. However, it would also be conceivable that no end stop elements 28 are provided. The first table element 2 would then be held in the second position merely by the second resistance force or by the friction between the friction surfaces 23a, 24a and the friction surfaces 21a. According to a further embodiment, the end stop elements 28 are arranged in such a way that a stop occurs both in the first position and in the second position.

The second table element 3 is pivotally arranged on the first table element 2 and the fastening elements 6. The second table element 3 comprises a receiving element 16, which is advantageously designed in two parts. A first part 16a of the pick-up element 16 can be connected to a second part 16b of the receiving element 16 by means of a connection, which can be, for example, a positive and/or non-positive connection. As can be seen in FIG. 1, a connection with fastening means in the form of screws is provided in the present case. In an assembled state, the receiving element 16 forms a circular hollow-cylindrical receiving area 29 at its ends lying along the width axis Y. The receiving element 16 has a ring-like fastening element 6.

The fastening element 6 comprises an annular guide projection 30, on which the hollow cylindrical receiving area 29 rests and is guided during pivoting. The pivoting movement of the second table element 3 relative to the first table element 2 is thus guided by the bearing of the hollow cylindrical receiving area 29 on the ring-like guide projection 30 of the fastening element 6. Furthermore, a bearing ring 31 is provided between the hollow cylindrical receiving area 29 and the annular guide projection 30 of the fastening element 6.

The two mandrel-like elements 11 project into a receiving element 16 of the second table element 3 in sections and, in particular, through the hollow cylindrical receiving region 29.

An attachment component 15 is attached to a mandrel-like element 11. It would also be conceivable to have an embodiment in which an attachment component 15 is fastened to each of the two mandrel-like elements 11. The attachment component 15 is attached to the mandrel-like element 11 by a fastening means 36, preferably a screw. The screw is engaged in an internal thread on the mandrel-like element 11.

A second friction element 17 is further arranged between the attachment component 15 and the receiving element 16 of the second table element 3. Thereby, the second friction element 17 is fixed in the receiving element 16 of the second table element 3. There is an overpressing of the second friction element 17 to the attachment component 15. The first resistance force is thus caused by the friction between the attachment component 15 and the second friction element 17. The attachment component 15 has a plurality of friction surfaces 15a.

The second friction element 17 can be designed analogously to the first friction element 14. Thus, it also comprises an annular central portion 22, a first wing element 23 and a second wing element 24. The two wing elements 23, 24 are integrally formed with the annular central portion 22 and comprise respective friction surfaces 23a, 24a which are formed opposite to each other. The friction surfaces 23a, 24a are in friction contact with the friction surfaces 15a of the attachment component 15.

The two wing elements 23, 24 of the second friction element 17 are arranged on a second receiving area 35 of the receiving element 16. This arrangement or fastening is such that, when the second table element 3 is pivoted, the two wing elements 23, 24 of the second friction element 17 move together with the second table element 3. The friction surfaces 23a and 24a of the second friction element 17 thus rub against the friction surfaces 15a of the attachment component 15. The two wing elements 23, 24 are preferably arranged in a form-fitting manner in the second receiving area 35 of the receiving element 16. The second receiving area 35 is designed in such a way that, in the installed state, there is an overpressing of the two wing elements 23, 24 of the second friction element 17 towards the respective friction surfaces 15a of the attachment component 15. The first resistance force is thus caused by the friction between the attachment component 15 and the second friction element 17.

Figure 10A:
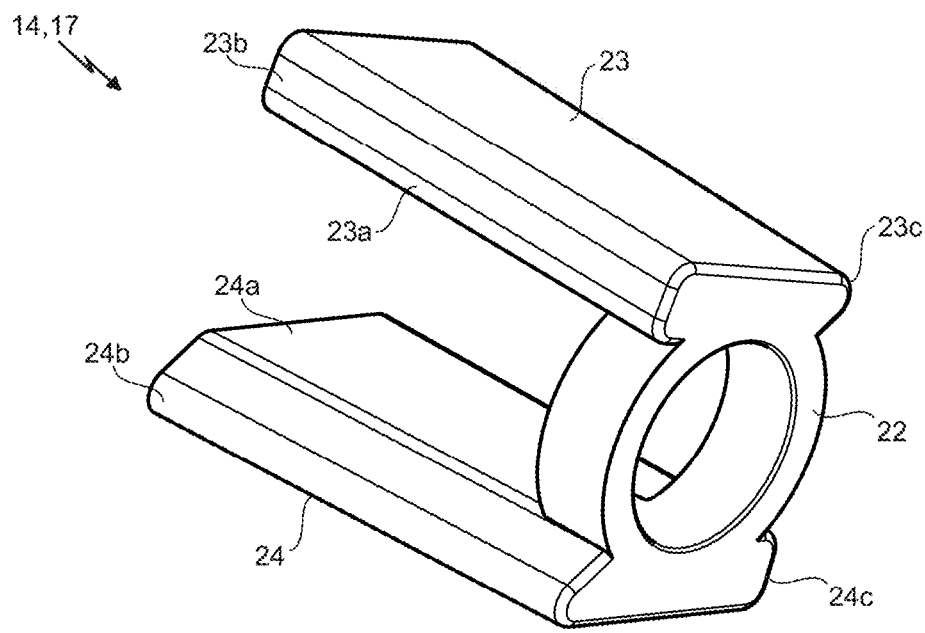
FIGS. 10a to 10d different views of a friction element.
Figure 10B:
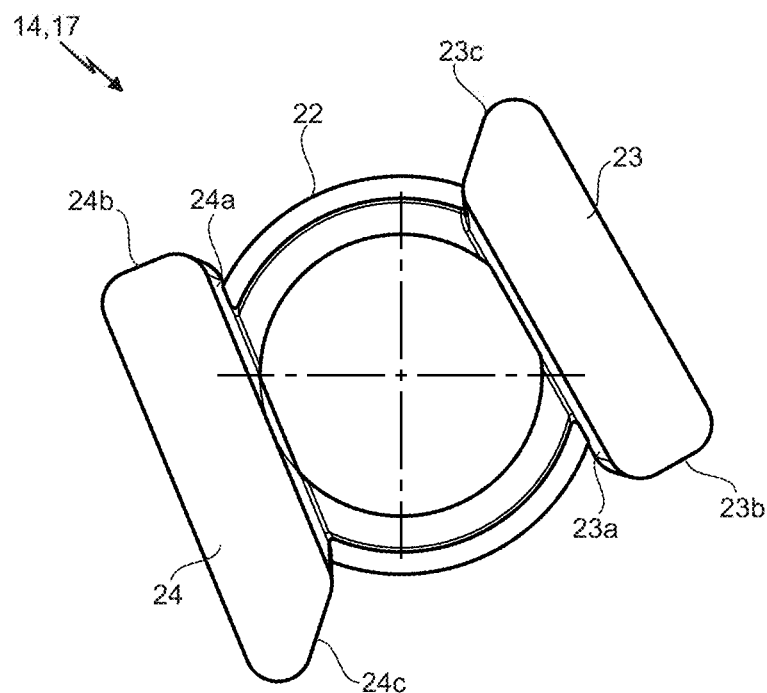
Figure 10C:
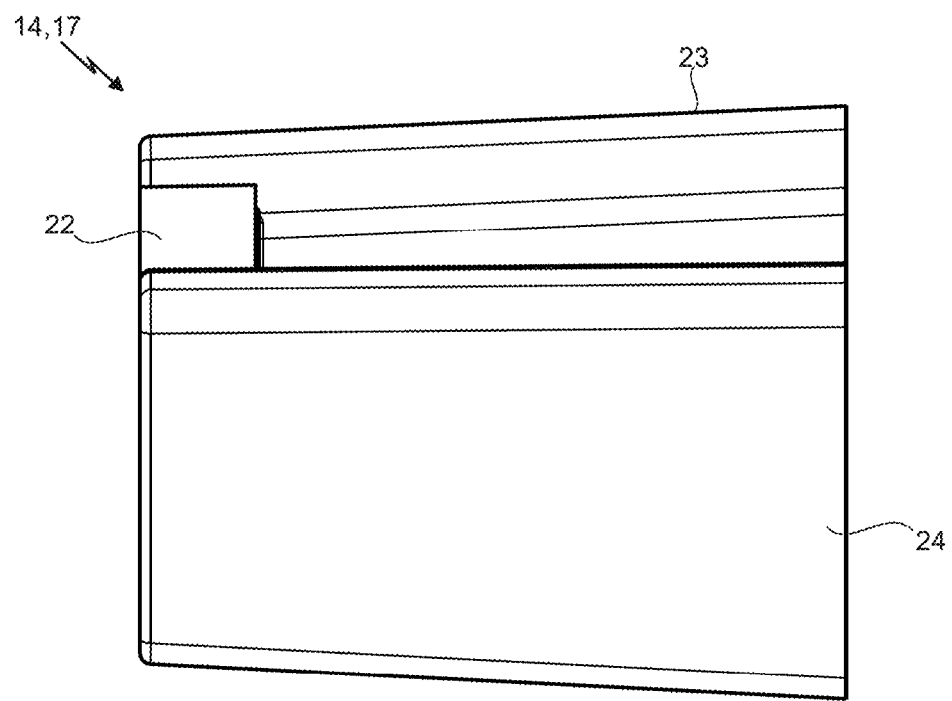
Figure 10D:
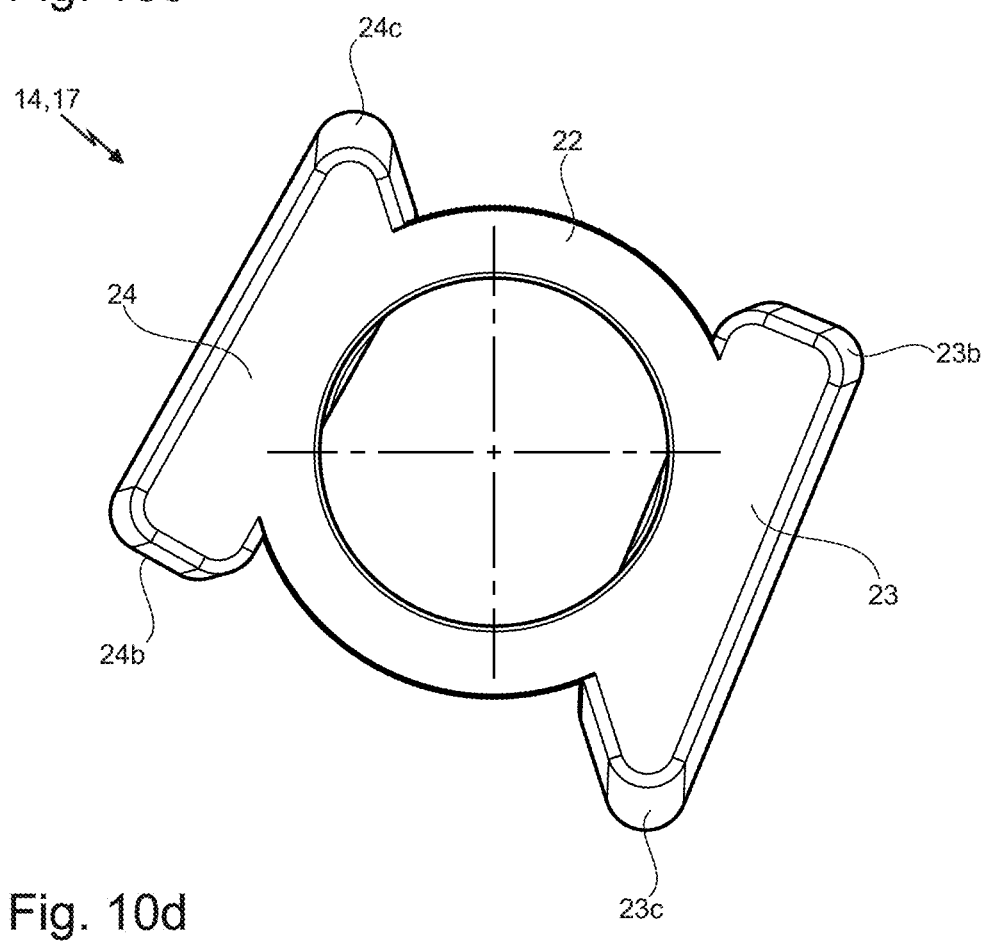

FIGS. 10a to 10d show a friction element which can be used as a first friction element 14 or as a second friction element 17. Of course, the ab-measurements for the two types of friction elements 14, 17 can be designed differently. FIG. 10a is a perspective view. FIGS. 10b and 10d are top views and FIG. 10c is a side view. An annular central portion 22, a first wing element 23 and a second wing element 24 are shown. The two wing elements 23, 24 are integrally formed with the annular central portion 22 and include respective friction surfaces 23a, 24a which are formed opposite to each other. The wing elements 23, 24 each comprise two side surfaces 23b, 23c, 24b, 24c. A first side surface 23b, 24b extends substantially perpendicular to an associated friction surface 23a, 24a. The second side surfaces 23c, 24c are substantially wedge-shaped. Here, substantially means that the roundings shown in the figures are not taken into account. In FIGS. 10b and 10d, it can be seen that the first side surface 23b of the first wing element 23 is diagonally opposite to the first side surface 24b of the second wing element 24. Likewise, the second side surface 23c of the first wing element 23 is diagonally opposite to the second side surface 24c of the second wing element 24. Such a configuration can ensure stable accommodation in the respective receiving elements, i.e. the fastening member 6 or the receiving element 16.

Figure 11A:
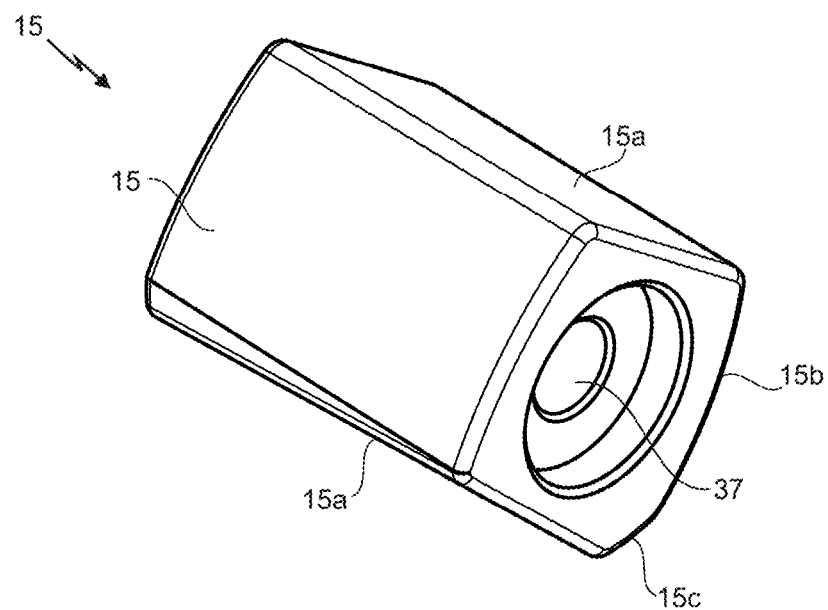
FIGS. 11a to 11d various views of an attachment component.
Figure 11B:
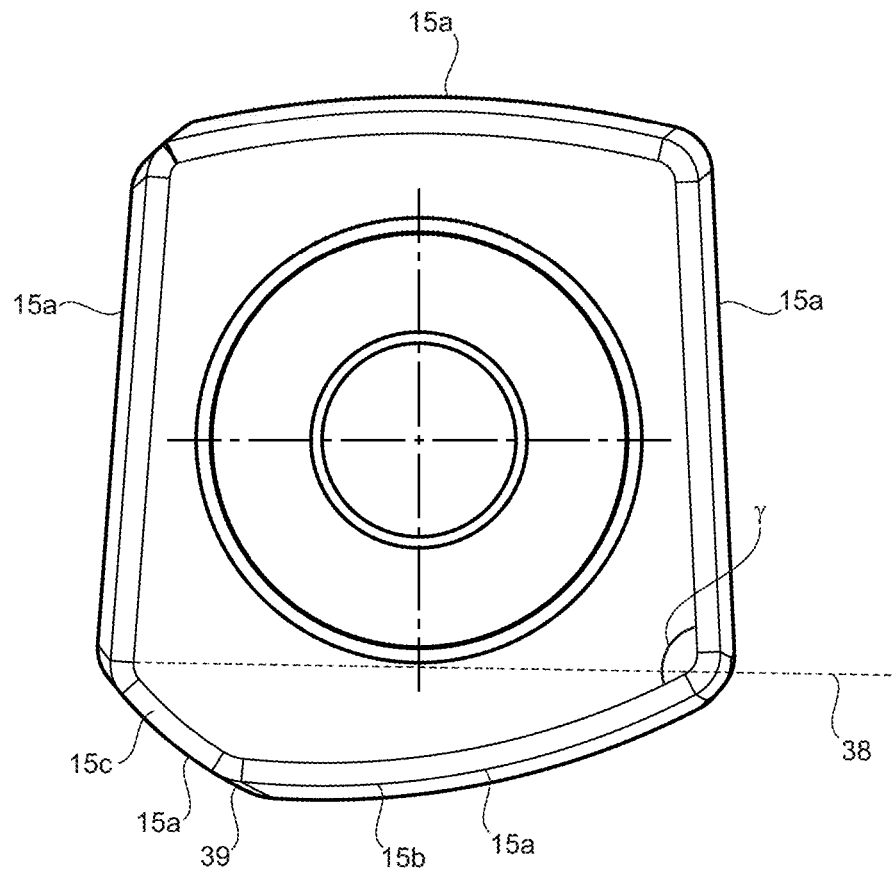
Figure 11C:
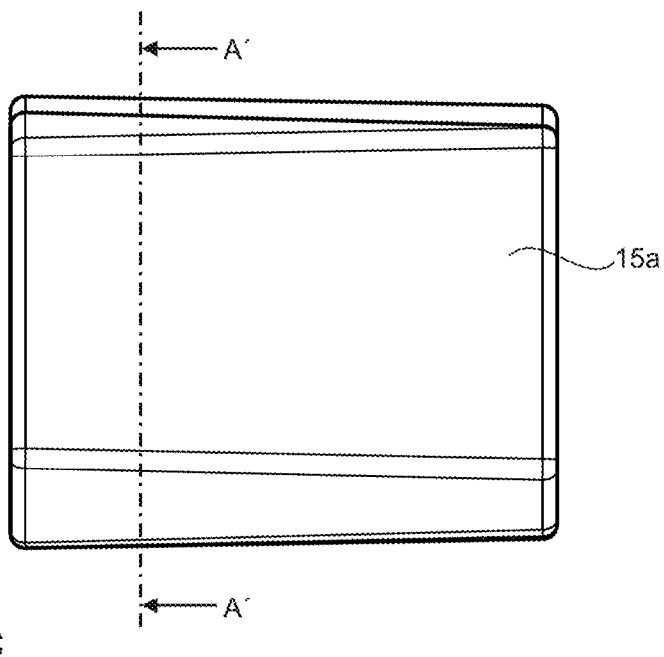
Figure 11D:
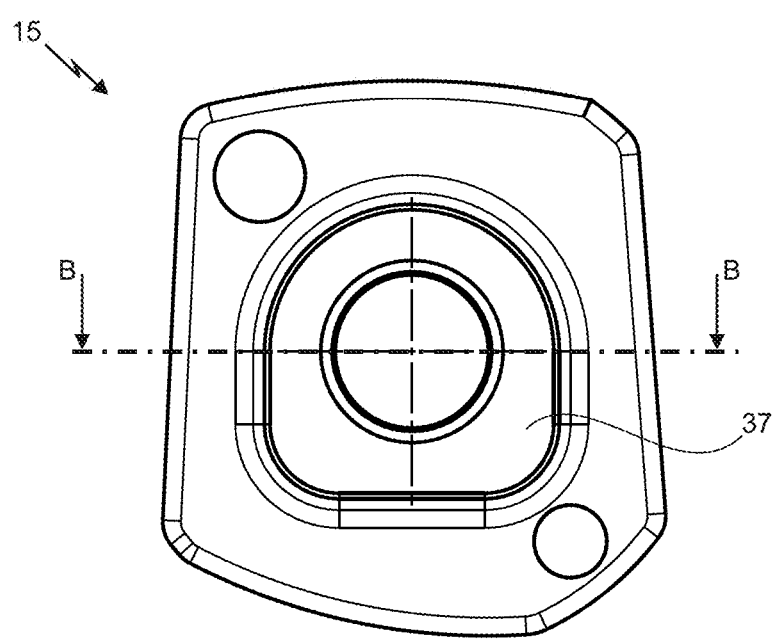
Figure 12A:
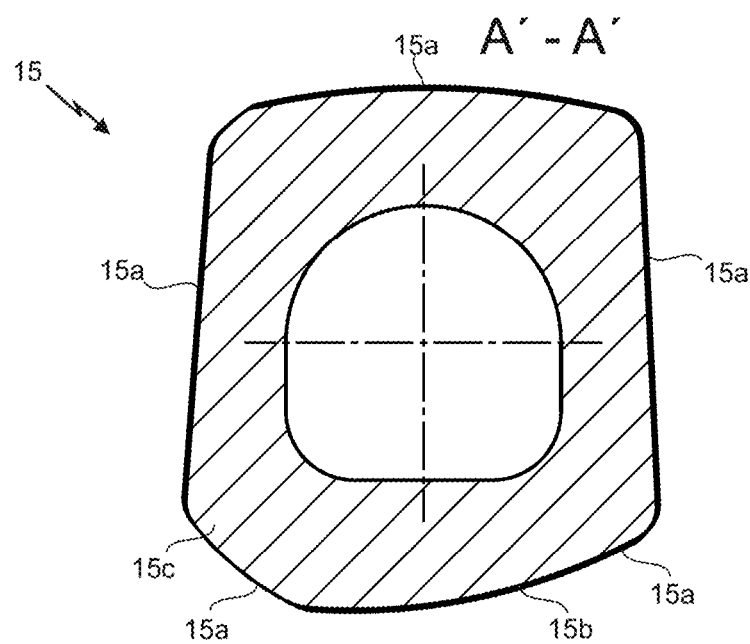
FIGS. 12a to 12b various sectional views of the attachment component.
Figure 12B:
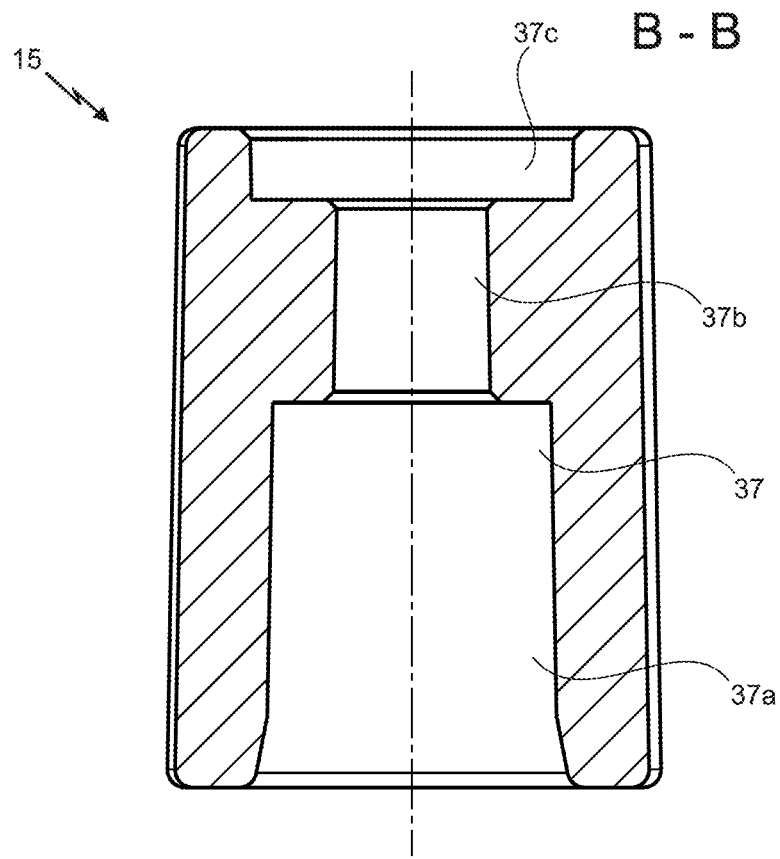

FIGS. 11a to 11d and FIGS. 12a and 12b show the attachment component 15 in detail. FIG. 11a is a perspective view. FIGS. 11b and 11d are top views. FIG. 11c is a side view. In FIG. 12a a sectional view A-A' is shown according to the sectional axis in FIG. 11c. FIG. 12b shows a sectional view B-B according to the sectional axis in FIG. 11d. The lateral surface of the attachment component 15 is composed of several friction surfaces 15a, which are in contact with the friction surfaces 23a, 24a of the second friction element 17 depending on the angle α. A corresponding sequence can be readily seen in FIG. 9. The attachment component 15 is a modified square element. A lower sidewall 115b is deviated from a square arrangement. An interior angle γ between the lower side wall 15b and an adjacent side surface is greater than 90°, preferably in a range between 92° and 110°. The interior angle γ is arranged at the transition edge 38. Due to this embodiment, attachment component 15 comprises an additional side wall 15c, which is arranged between lower side wall 15b and another side wall. The second transition edge 39 is at the transition between the lower side wall 15b and the additional side wall 15c. Also, the lower side wall 15b and the additional side wall 15c comprise friction surfaces 15a.

Advantageously, the rear portion 21 of mandrel-like element 11 is formed to correspond to attachment component 15. That is, the arrangement of the friction surfaces 21a corresponds to the arrangement of the friction surfaces 15a.

The attachment component 15 has a second through channel 37 which has various sections 37a, 37b, 37c. FIG. 12b shows the sections. A first section 37a is for receiving the front portion 19 of mandrel-like element 11, which section has a cross-section corresponding to the cross-section of the front portion 19 of mandrel-like element 11. FIG. 11d and FIG. 12a show this cross-section. The cross section is a modified square cross section. The square cross-section is modified in that the upper half is formed as an arc of a circle. The other sections 37b and 37c of the second through channel 37 serve to receive the fastening means 36, with the third section 37c serving to receive the screw head and the second section 37b serving to receive the screw.

Figure 13:
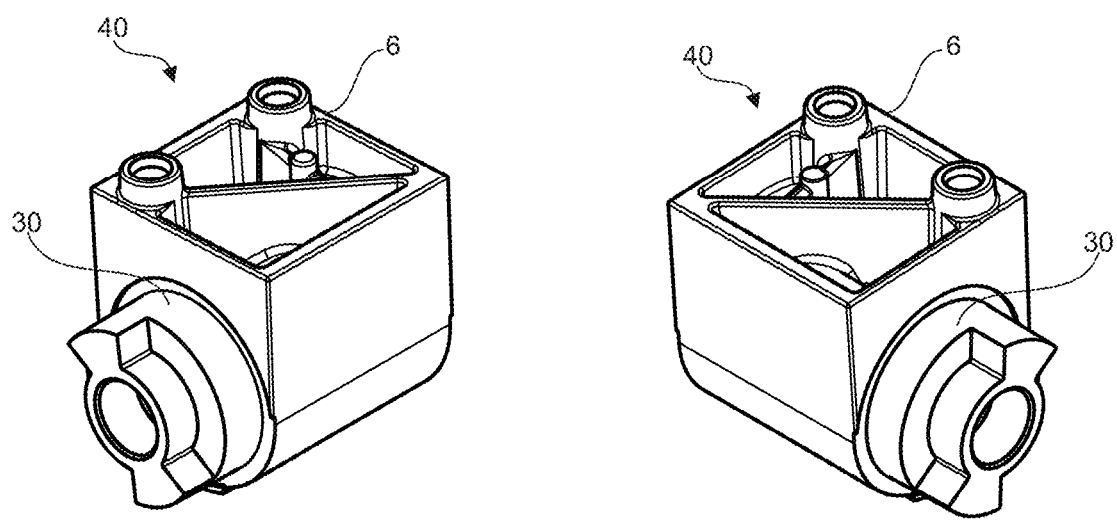
FIGS. 13, 13a to 13f various views of the fastening element.
Figure 13A:
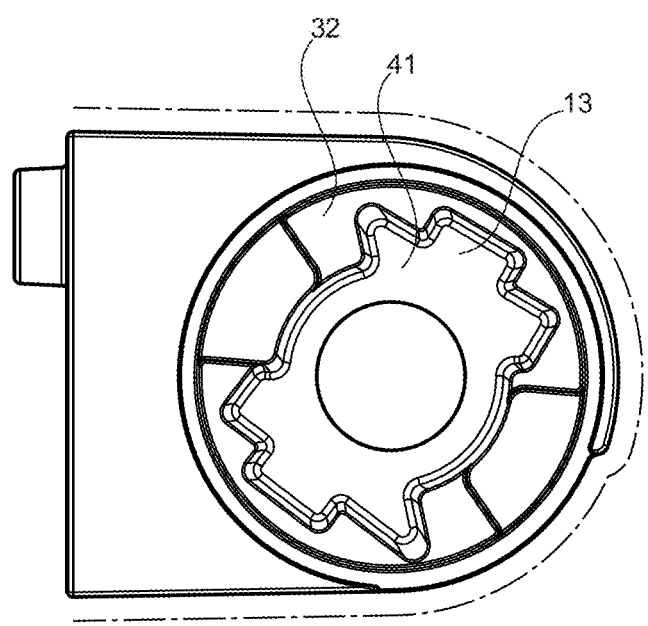
Figure 13B:
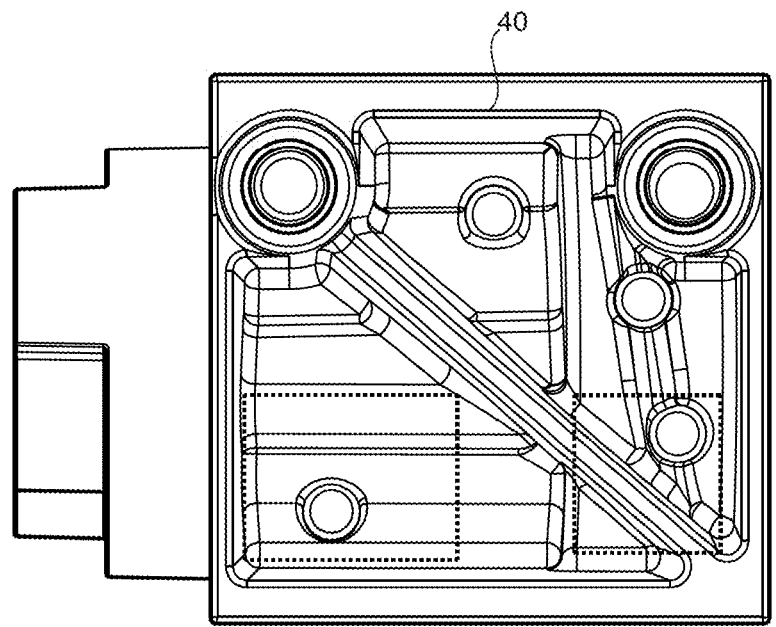
Figure 13C:
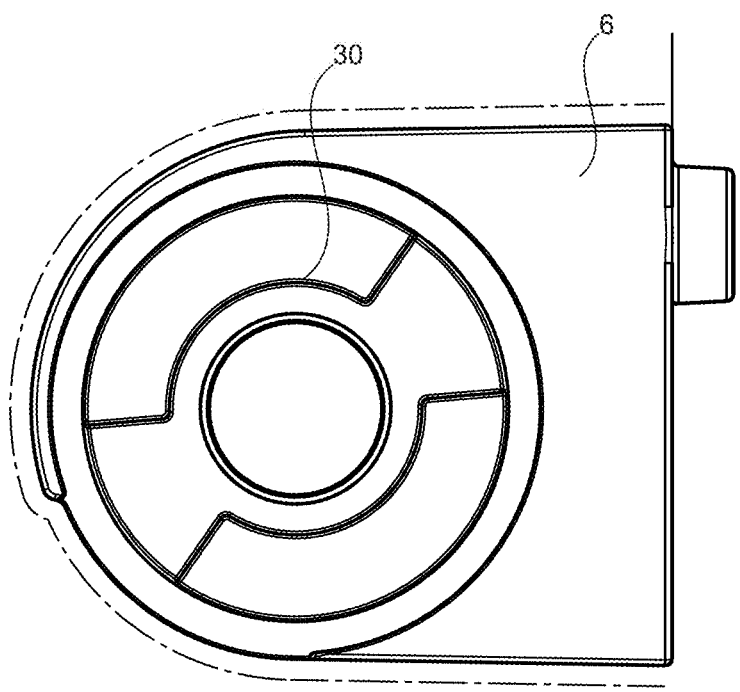
Figure 13D:
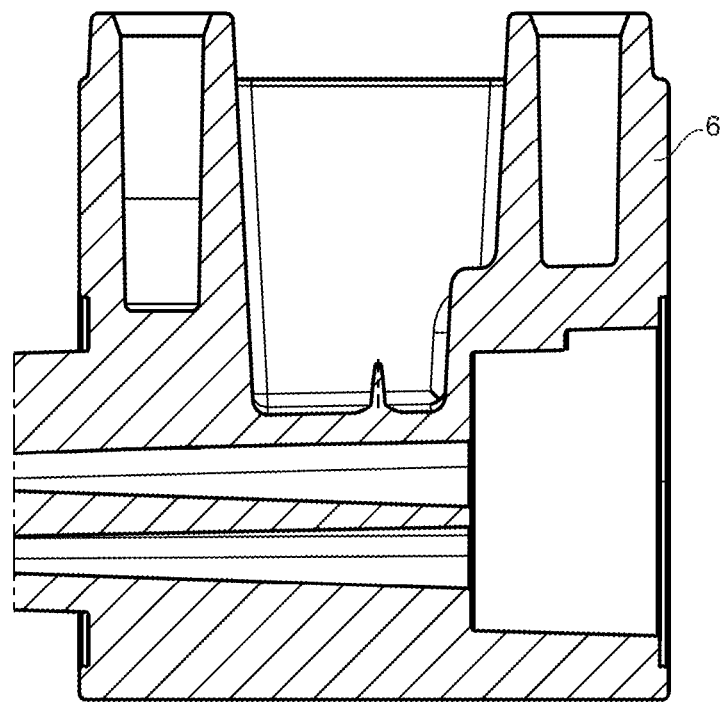
Figure 13E:
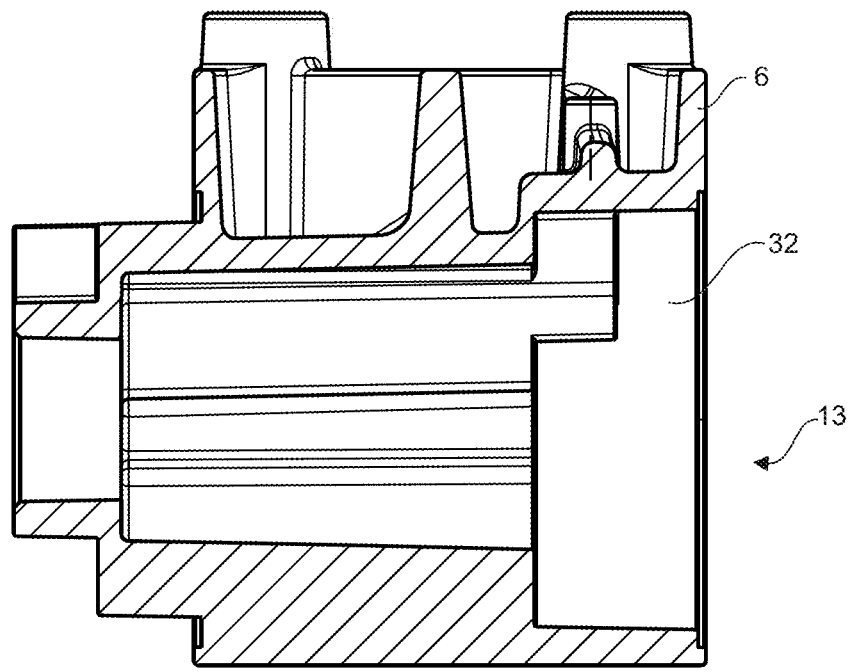
Figure 13F:
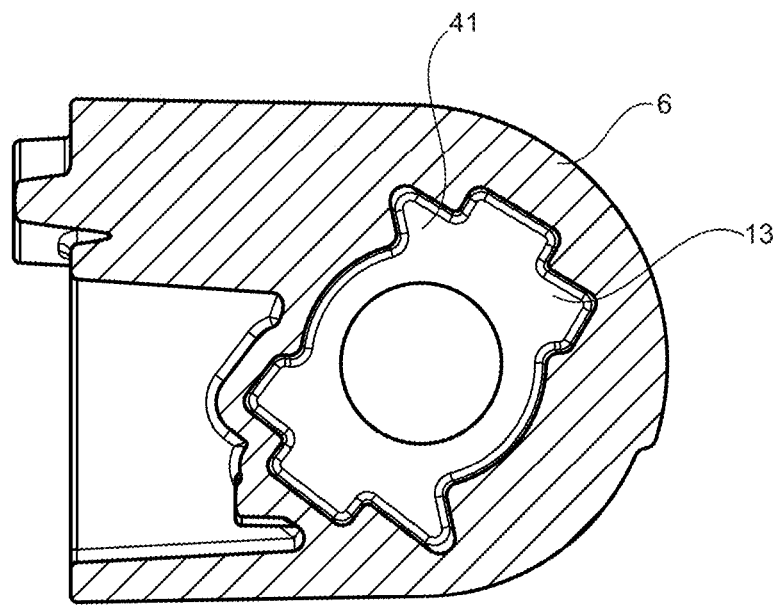

FIGS. 13, 13a to 13f show the fastening elements 6 in detail. FIG. 13 is a perspective view of the fastening elements 6. FIGS. 13a and 13c each show a side view. FIG. 13b shows a top view showing a contact surface 40 of the fastening element 6. This contact surface 40 rests against a front seat arrangement or a section of the passenger transport means. Openings for fastening the fastening element 6 are also shown. Thus, the fastening element can be fastened by means of screws. The fastening element 6 comprises a first through channel 13, which comprises a hollow cylindrical receiving area 32 in which the circular guide area 25 of the mandrel-like element 11 is received. Furthermore, a second receiving section 41 for first friction element 14 is shown in the through channel. This second receiving area 41 has the contour of the two wing elements 23, 24. In FIGS. 13d, 13e and 13f, the sections A-A, B-B and C-C from FIG. 13b are shown. In FIGS. 13e and 13f, the first through channel 13 is shown in detail with the hollow cylindrical receiving area 32 and the second receiving area 41. The fastening element 6 includes an annular guide projection 30 described above, which may optionally include end stop elements. However, the invention is not limited to the presence of such end stop elements.

FIGS. 8 and 9 show a sequence of pivoting of the second table element 3 through an angle α. In FIG. 8, sectional views are shown along the sectional axis A-A in FIG. 6. In FIG. 9, sectional views are shown along the sectional axis E-E in FIG. 6. In FIGS. 8*a*, 9*a*, the angle α=0°. In FIGS. 8*b*, 9*b* the angle α=20°. In FIGS. 8*c*, 9*c* the angle α=70°. In FIGS. 8*d*, 9*d* the angle α=85°. Here, it is readily apparent how the second friction element 17 is co-rotated with the second table element 3 and a corresponding movement occurs relative to the attachment component 15. This relative movement generates friction at the corresponding friction surfaces 15*a*, 23*a*, 24*a*. At an angle of about 70°, a friction surface 23*a*, 24*a* has moved completely over the transition edges 38. At a further tilt, movement takes place over the second transition edge 39. If the second table element 3 is in the second position, it is held by the first resistance force or the friction between the friction surfaces 15*a* and 23*a*, 24*a*. If the first table element 2 is now also swiveled into the second position, the attachment component 15 rotates relative to the second friction element 17. If the first table element 2 is finally in the second position, as is the second table element 3, the attachment component 15 and the second friction element 17 have the same initial position as in the state at angle α=0° (both table elements in the first position). The first resistance force then causes the first table element 2 and the second table element 3 to be able to pivot together to the first position. The design of the attachment component 15 as a modified square edge element favors the pivoting of the first table element 2 and the second table element 3 to the second position.

FIG. 3*a* shows a condition in which both the first table element 2 and the second table element 3 are in the first position. Both table elements are held there constantly in position by the friction elements. The second table element 3 can be braked down to the second position independently of the first table element 2 and can also be folded back up to the first position. This is shown in FIG. 3*b*. When folded up, the second table element 3 is held steadily in the upper end position, the first position, by the second friction element 17. The first table element 2 can be swiveled together with the second table element 3 downward to the second position and upward to the first position. Both table elements 2, 3 are locked together by the second friction element 17. The joint pivoting is braked by means of the first friction elements 14 and the folding takes place jointly. The first table element 2 can follow the second table element into the second position, see FIG. 3*c*. In this case, the first table element 2 locks itself in the lower second position by means of the second friction element 17 together with the second table element.

Figure 14:
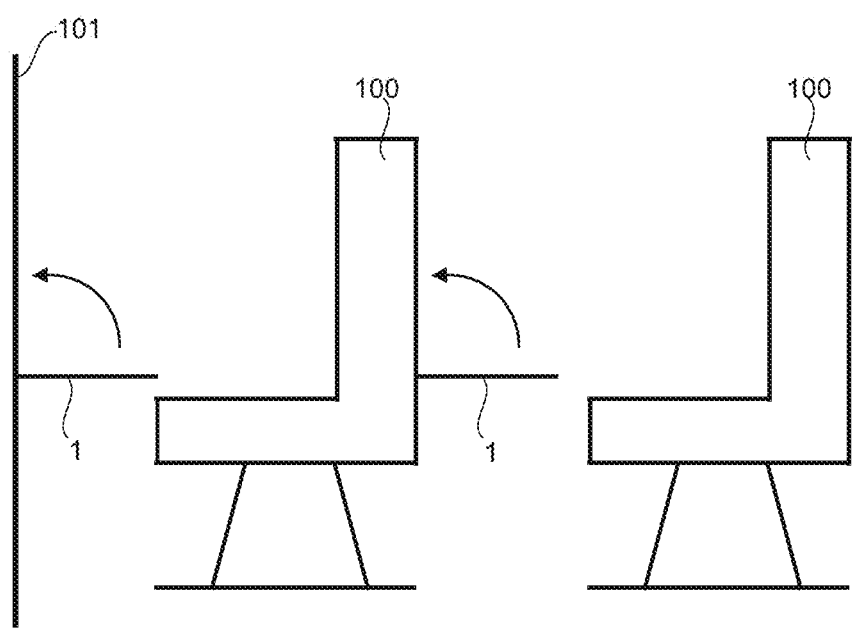
FIG. 14 a seat arrangement with a table device.

By means of the fastening elements 6, the table device 1 can be attached to a rear side of a seat arrangement 100 or to a section 101 of the passenger transport means. Accordingly, the table device 1 can be used by an occupant in a seat arrangement arranged therebehind. FIG. 14 shows an example of a seat arrangement 100 in a passenger transport means comprising a table device 1.

The applicant reserves the right to claim all features disclosed in the application documents as essential to the invention, provided that they are individually or in combination new compared to the prior art. It is further pointed out that the individual figures also describe features which may be advantageous in themselves. The person skilled in the art recognizes immediately that a certain feature described in a figure can also be advantageous without adopting further features from this figure. Furthermore, the skilled person recognizes that advantages can also result from a combination of several features shown in individual figures or in different figures.

LIST OF REFERENCE SIGNS

1 table device
2 first table element
2*a* rear side of the first table element
3 second table element
4 lower area of the first table element
5 lower area of the second table element
6 fastening element
7 recess
8 first surface
9 second surface
10 holding and adjustment mechanism
11 mandrel-like element
12 bearing section
13 first through channel
14 first friction element
15 attachment component
15*a* friction surfaces of the attachment component
15*b* lower side wall
15*c* additional side wall
16 receiving element
16*a* first part
16*b* second part
17 second friction element
18 indentation
19 front portion of mandrel-like element
20 middle portion of the mandrel-like element
21 rear portion of mandrel-like element
21*a* rear portion friction surface
22 annular central portion
23 first wing element
23*a* friction surface
23*b* first side surface
23*c* second side surface
24 second wing element
24*a* friction surface
24*b* first side surface
24*c* second side surface
25 circular guide area
26 bearing sheath
27 bearing ring
28 end stop element
29 how cylindrical receiving area of the receiving element
30 annular guide projection
31 bearing ring
32 hollow cylindrical receiving area of the first through channel
33 second receiving area of the first through channel
34 end region of the first through channel
35 second receiving area of the pick-up element
36 fastening means
37 second through channel
37*a* first section of second through channel
37*b* second section of the second through channel
37*c* third section of second through channel
38 first transition edge
39 second transition edge
40 contact surface
41 receiving section for friction element
100 seat arrangement
101 Section of the passenger transport means
α angle β angle
γ angle
S pivot axis
X longitudinal axis
Y Width axis
Z height axis

What is claimed is:

1. A table device, for a seat arrangement in a passenger transport means, comprising a first table element, wherein the first table element at least partially encloses a second table element, the second table element being displaceable both together with the first table element and independently of the first table element between a first position and a second position, wherein a holding and adjustment mechanism is provided, which provides at least one first resistance force, wherein the at least one first resistance force acts between the first table element and the second table element, so that a common movement from the first position to the second position as well as from the second position to the first position is enabled, wherein the holding and adjustment mechanism provides at least one second resistance force, the at least one second resistance force acting between the first table element and at least one of at least two fastening elements, wherein the holding and adjustment mechanism comprises two mandrel elements, the mandrel elements each being arranged on a bearing section of the first table element, wherein, respectively, one mandrel element projects through a first through channel of a corresponding fastening element, wherein a first friction element is arranged between one of the two mandrel elements and a respective fastening element, wherein there being an overpressing of the first friction element towards the one of the two mandrel elements, the at least one second resistance force being caused by the friction between the one of the two mandrel elements and the first friction element.

2. The table device according to claim 1, wherein the first table element and the second table element are pivotable about a pivot axis S which extends in a lower area of the first table element along the longitudinal axis X and in a lower area of the second table element along the longitudinal axis X, wherein the second table element is pivotable about the pivot axis S both together with the first table element and independently of the first table element, wherein the table device comprises the at least two fastening elements by means of which the table device can be arranged on at least one of a seat arrangement or on a means of transporting persons, wherein an angle α is formed between the first table element and the second table element, wherein the angle α lies in a range between 0° and 95°, wherein an angle β is formed between the first position and the second position, wherein the angle β lies in a range between 80° and 95°.

3. The table device according to claim 1, wherein the first table element has a recess in which the second table element can be arranged, at least one of the first table element or the second table element providing a supporting surface in the second position, wherein the first table element has a first surface which, in the second position, forms the supporting surface at least partially, wherein the second table has a second surface, which in the second position forms the supporting surface.

4. The table device according to claim 1, wherein a braked movement of the second table element from the first position to the second position is enabled by the at least the first resistance force.

5. The table device according to claim 1, whereby by means of the at least one second resistance force the first table element is held in the first position, whereby by means of the at least one second resistance force a braked movement of the first table element from the first position to the second position is enabled.

6. The table device according to claim 4, wherein the two mandrel elements are arranged opposite each other along a width axis Y.

7. The table device according to claim 6, wherein the first friction element being fixed to or in one of the at least two fastening elements.

8. The table device according to claim 1, wherein the second table element is pivotably arranged on the first table element and one of the at least two fastening elements, the two mandrel elements projecting in sections into a receiving element of the second table element.

9. The table device according to claim 8, wherein an attachment component is fastened to at least one mandrel element, a second friction element being arranged between the attachment component and the receiving element of the second table element, wherein the second friction element is attached to or in the receiving element of the second table element, wherein there is an overpressing of the second friction element to the attachment component, wherein the at least one first resistance force is caused by the friction between the attachment component and the second friction element.

10. A seat arrangement in a passenger transport means comprising a table device according to claim 1.

* * * * *